(No Model.)
E. R. BULLARD.
DIAPHRAGM FOR PHOTOGRAPHIC LENSES.
No. 483,135. Patented Sept. 27, 1892.
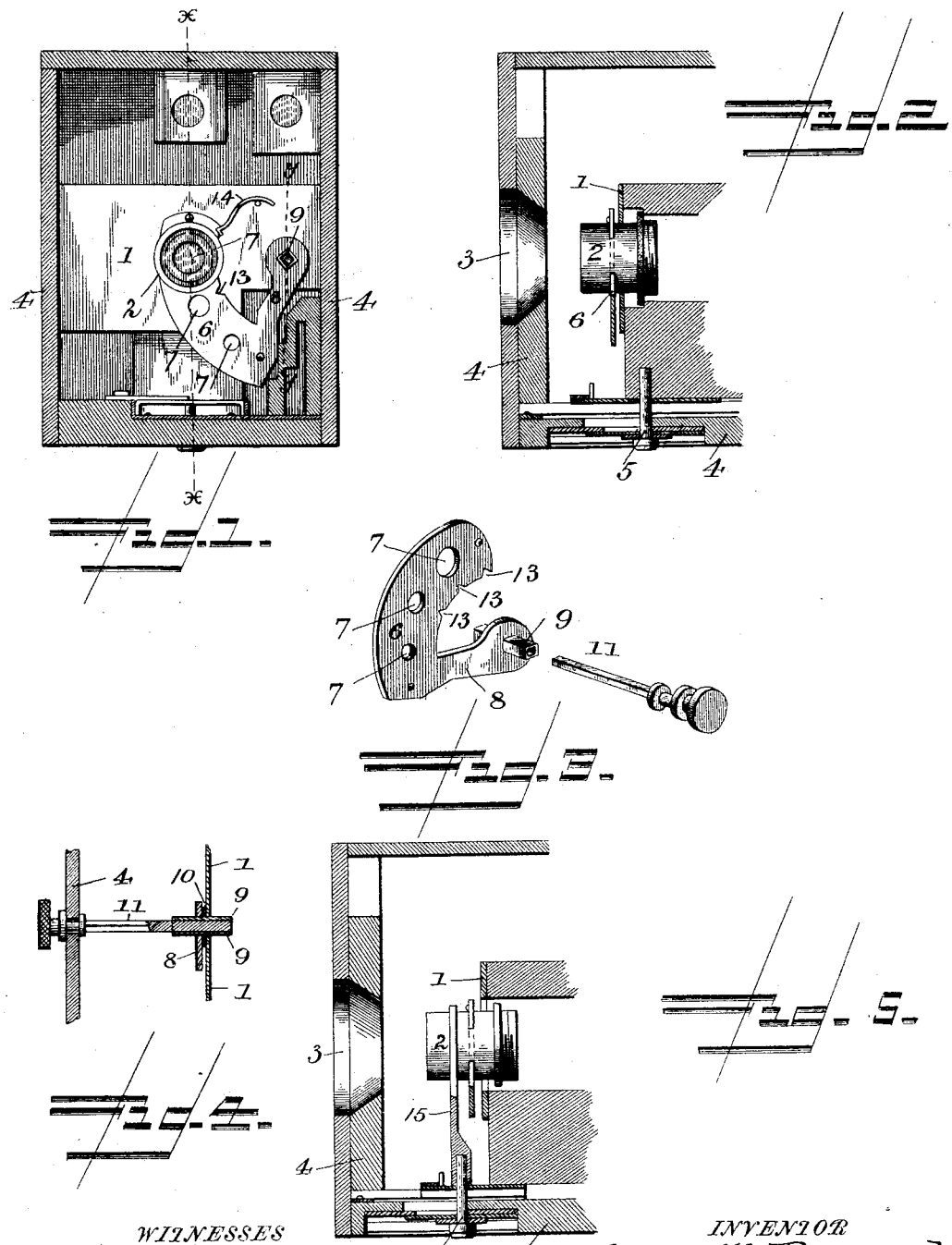
WITNESSES
INVENTOR
Edgar R. Bullard
by Howard Bros
Attorneys

UNITED STATES PATENT OFFICE.

EDGAR R. BULLARD, OF WHEELING, WEST VIRGINIA.

DIAPHRAGM FOR PHOTOGRAPHIC LENSES.

SPECIFICATION forming part of Letters Patent No. 483,135, dated September 27, 1892.

Application filed September 30, 1891. Serial No. 407,361. (No model.)

*To all whom it may concern:*

Be it known that I, EDGAR R. BULLARD, a citizen of the United States, residing at Wheeling, in the county of Ohio and State of West Virginia, have invented or discovered certain new and useful Improvements in Diaphragms or Stops for Photographic Lenses, of which the following is a specification.

My invention relates to certain improvements in diaphragms or stops used in photographic lenses.

This invention is particularly applicable to that class of photographic cameras generally known as "detective-cameras," and has for its object the provision of suitable means whereby the diaphragms or stops may be passed in and out of the lens-tube at pleasure from the outside of the camera with facility and accuracy, offering great advantage over those in which it is necessary to open the camera for the introduction of separate stops or for operating the well-known rotary stops, and, further, permitting the lens-tube to be adjusted back and forth, carrying therewith the stops.

The invention consists in certain novel features in the construction and arrangement of parts, all as hereinafter fully set forth.

In the accompanying drawings, in which my invention is fully illustrated, Figure 1 is a front view of a camera having my improvements applied thereto and disclosed by the removal of the front end of the camera. Fig. 2 is a longitudinal vertical sectional view of the camera, taken on the line $x\ x$ of Fig. 1. Fig. 3 are views in perspective of the stop-plate and the spindle by which said stop-plate is operated back and forth through the lens-tube, as well as forming a slide for its movement back and forth. Fig. 4 is a sectional view of a portion of the camera, taken on line $y\ y$ of Fig. 1, the end of the camera being shown in place and the spindle for operating the stop-plate permanently journaled therein. Fig. 5 shows a modification in the manner of shifting the lens-tube independent of the lens-board, which is stationary, the view illustrated being a longitudinal vertical section similar to Fig. 2.

Referring to the drawings by numerals, 1 designates the lens board or frame to which the lens-tube 2 is ordinarily connected, the said frame 1 being shown in the form of a T-shaped metal plate affixed to a suitable backing, the entire frame being suitably mounted in the interior of the camera, so as to be slid back and forth for the proper focusing of the lens. This adjustment of the lens-tube within the camera to and from the exposure-orifice 3 in the end of the box 4 is accomplished by means of the extension 5, which in the form of a bolt extending through the box from the under side and into the sliding lens-carrying frame is operated back and forth within a slot made for the purpose. The lens-tube 2 is slotted through its upper and lower sides to admit the passage therethrough of the curved slide 6, containing the different-sized apertures 7. This curved slide 6 connects at one end with a radial arm 8, one end of which arm is pivoted to the lens-carrying board or frame 1.

As the prime object of the invention is to operate the curved plate 6 from the outside of the camera-box and to allow the curved plate to be carried back and forth by the lens-tube in its adjustments without hinderance, I have provided the pivotal end of the radial arm 8 with a square tube or sleeve 9, extending therethrough, which has its rear end journaled in a round bearing in the lens-board 1 or, preferably, in a block or other suitable support or extension 10, which also serves to bring the curved plate and radial arm in line with the slot in the lens-tube, the curve of the plate 6 and the angle at which the radial arm 8 extends from said plate, together with its length, being so proportioned that the sleeve 9 forms their axis or center. Through the sleeve 9 extends a square rod or spindle 11, which is journaled in the front end of the casing or box 4 and provided with a milled head on the outside, by which it is operated. This spindle 11, while adapted to be turned to operate the stops, is made secure in the casing and has no movement back and forward, but remains secure therein.

Provision is made through the lens board or frame 1 for the extension therethrough of the end of the spindle when the board is shifted forward. It will be seen that the plate 6 at its pivotal point and by means of sleeve 9 is operated back and forth on the square spindle 11, which, being normally stationary, serves as a slide-rod, and hence its twofold function. On the inner edge of the curved slide-plate 6 are notches 13, which are engaged by the spring 14, held normally against the inner edge of the plate and by which it is held in its desired position.

It will be noticed that the invention is illustrated principally with the shiftable lens 2 within the camera or box secured to a lens-board which is moved back and forth, this being the general plan. In those cameras, however, in which the lens-tube is shifted separately from the board, the board remaining stationary, a projecting arm 15 may be attached to the lens-tube and form a substitute for the lens-board if extended laterally therefrom. The lens-board in this modification would be stationary and the lens-tube adapted to move back and forth through the same, as shown in Fig. 5.

Having thus described my invention, what I claim, and desire to secure by Letters Patent, is—

In a photographic camera, the lens-tube within the camera-casing, adapted to be shifted to and from the exposure-orifice, a curved plate or slide having openings therein, said plate inserted through openings in the lens-tube, a radial arm connected to said curved plate and pivotally secured to the frame for shifting the lens-tube, a square sleeve extending through the radial arm at its pivotal point, and a square spindle extending through the camera-casing and loosely engaging the square sleeve, substantially as described, and for the purpose specified.

In testimony whereof I have hereunto set my hand.

EDGAR R. BULLARD.

Witnesses:
I. S. GIBBS,
R. J. BULLARD, Jr.